(12) United States Patent
Baumgartner et al.

(10) Patent No.: US 7,668,751 B2
(45) Date of Patent: *Feb. 23, 2010

(54) METHODS AND SYSTEMS FOR COORDINATING A CHANGE IN STATUS OF STORED-VALUE CARDS

(75) Inventors: David Baumgartner, Parker, CO (US); Steven E. Arthur, Parker, CO (US)

(73) Assignee: First Data Corporation, Greenwood Village, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 12/147,944

(22) Filed: Jun. 27, 2008

(65) Prior Publication Data

US 2008/0262935 A1    Oct. 23, 2008

Related U.S. Application Data

(63) Continuation of application No. 10/371,167, filed on Feb. 21, 2003, now Pat. No. 7,409,358.

(51) Int. Cl.
*G06Q 20/00* (2006.01)

(52) U.S. Cl. .............................. 705/17; 705/21; 705/16; 705/27; 235/380

(58) Field of Classification Search ........................ None
See application file for complete search history.

(56) References Cited

U.S. PATENT DOCUMENTS

| | | | |
|---|---|---|---|
| 4,528,643 A | 7/1985 | Freeny, Jr. | |
| 4,700,055 A | 10/1987 | Kashkashian, Jr. | |
| 4,884,212 A | 11/1989 | Stutsman | |
| 5,146,067 A | 9/1992 | Sloan et al. | |
| 5,220,501 A | 6/1993 | Lawlor et al. | |
| 5,255,182 A | 10/1993 | Adams | |
| 5,352,876 A | 10/1994 | Watanabe et al. | |
| 5,440,108 A | 8/1995 | Tran et al. | |
| 5,471,669 A | 11/1995 | Lidman | |
| 5,477,038 A | 12/1995 | Levine et al. | |
| 5,504,808 A | 4/1996 | Hamrick, Jr. | |
| 5,511,114 A | 4/1996 | Stimson et al. | |
| 5,513,117 A | 4/1996 | Small | |
| 5,557,516 A | 9/1996 | Hogan | |
| 5,577,109 A * | 11/1996 | Stimson et al. | ........... 379/114.2 |

(Continued)

*Primary Examiner*—F. Zeender
*Assistant Examiner*—Luna Champagne
(74) *Attorney, Agent, or Firm*—Townsend and Townsend and Crew LLP

(57) ABSTRACT

Methods and systems are provided for coordinating a change in status of a stored-value card for a customer. Transaction information is received at a host system from a point-of-sale terminal. The transaction information includes stored-value-card information identifying the stored-value card and payment-instrument information identifying a payment instrument to be used for financing the change in status of the stored-value card. The host system receives a payment authorization from a payment authority in response to a transmission of the payment-instrument information to the payment authority. The host system also receives a confirmation of the change in status of the stored-value card from a stored-value-card authority in response to a transmission of the stored-value-card information to the stored-value-card authority. The host system transmits an approval for effecting the change in status of the stored-value card to the point-of-sale terminal.

24 Claims, 5 Drawing Sheets

U.S. PATENT DOCUMENTS

| | | | |
|---|---|---|---|
| 5,592,400 | A | 1/1997 | Sasou et al. |
| 5,637,845 | A | 6/1997 | Kolls |
| 5,678,010 | A | 10/1997 | Pittenger et al. |
| 5,721,768 | A | 2/1998 | Stimson et al. |
| 5,796,832 | A | 8/1998 | Kawan |
| 5,868,236 | A | 2/1999 | Rademacher |
| 5,903,633 | A | 5/1999 | Lorsch |
| 5,914,472 | A | 6/1999 | Foladare et al. |
| 5,936,221 | A | 8/1999 | Corder et al. |
| 5,983,003 | A | 11/1999 | Lection et al. |
| 5,984,180 | A | 11/1999 | Albrecht |
| 5,984,181 | A | 11/1999 | Kreft |
| 5,987,438 | A | 11/1999 | Nakano et al. |
| 5,991,413 | A | 11/1999 | Arditti et al. |
| 5,991,748 | A | 11/1999 | Taskett |
| 6,006,988 | A | 12/1999 | Behrmann et al. |
| 6,129,275 | A | 10/2000 | Urquhart et al. |
| 6,169,975 | B1 | 1/2001 | White et al. |
| 6,193,155 | B1 | 2/2001 | Walker et al. |
| 6,295,522 | B1 | 9/2001 | Boesch |
| 6,298,336 | B1 | 10/2001 | Davis et al. |
| 6,370,514 | B1 | 4/2002 | Messner |
| 6,386,457 | B1 | 5/2002 | Sorie |
| 6,405,182 | B1 | 6/2002 | Cuervo |
| 6,473,500 | B1 * | 10/2002 | Risafi et al. ............ 379/144.01 |
| 6,507,644 | B1 * | 1/2003 | Henderson et al. ....... 379/114.2 |
| 6,510,983 | B2 | 1/2003 | Horowitz et al. |
| 7,409,358 | B2 * | 8/2008 | Baumgartner et al. ......... 705/17 |
| 2001/0018660 | A1 | 8/2001 | Sehr |
| 2001/0023409 | A1 | 9/2001 | Keil |
| 2001/0023415 | A1 | 9/2001 | Keil |
| 2001/0047342 | A1 | 11/2001 | Cuervo |
| 2002/0174016 | A1 | 11/2002 | Cuervo |
| 2003/0053609 | A1 | 3/2003 | Risafi et al. |

* cited by examiner

METHODS AND SYSTEMS FOR COORDINATING A CHANGE IN STATUS OF STORED-VALUE CARDS

BACKGROUND OF THE INVENTION

This application is related generally to stored-value cards. More specifically, this application is related to methods and systems for activating and otherwise coordinating a change in status of stored-value cards.

In recent years, stored-value cards have become increasingly popular among consumers. The increasing demand for such cards, in the form of prepaid gift cards and other types of stored-value cards, has resulted in a number of merchants wishing to offer stored-value cards for sale. Unfortunately, many such merchants are ill-equipped to offer the sale of stored-value cards to their customers in an efficient manner because of the nature of the financial infrastructure that they use.

For example, many merchants currently use cash-register machines that are equipped for storing money, performing arithmetic operations related to sales, and the like, but are not equipped for communication with external authorities. Such communication is generally needed for certain types of transactions, such as credit-card or debit-card based transactions, and is also used in order to activate stored value cards, which otherwise usually remain inactive until they are purchased. Accordingly, such merchants often have a separate communications device that is equipped to perform communication with external authorities. This arrangement works satisfactorily when communication need only be made with a single authority, such as for obtaining approval for a credit-card transaction, but does not work well when multiple authorities need to be contacted. In particular, when a stored-value card is purchased with a credit- or debit-card transaction, both authorization for the transaction and activation of the card require communications.

Thus, in such a transaction where a customer wishes to purchase a stored-value card, a clerk may take a credit or debit card from customer and swipe it through the communications device, entering the amount of the transaction. The communications device dials a payment authority for approval and, when approval is received, a receipt is printed and presented to the customer for signature. The clerk puts a copy of the receipt in the cash register. Subsequently, the clerk takes the inactive stored-value card and swipes it through the communications device, entering the amount to be activated on the card. The communications device dials an authority that activates the card and returns a code indicating that it has been activated. The activated card is then returned to the customer.

As is evident, this procedure requires significant handling of documents and cards by the clerk, and also requires multiple separate interactions with the communications device. Not only does the overall complexity of the procedure make the possibility of errors by clerks relatively high, the procedure also leaves open significant possibility for fraudulent activity, such as where the amount entered for the credit-card approval is deliberately different from the amount of value stored on the card.

There is accordingly a need in the art for methods and systems for simplifying procedures for activating stored-value cards and otherwise effecting a change in their status that do not require major upgrades in equipment by merchants.

BRIEF SUMMARY OF THE INVENTION

Embodiments of the invention generally provide methods and systems for coordinating a change in status of a stored-value card by making use of a host system to coordinate communications between a point-of-sale terminal and a payment and stored-value-card authorities.

In one set of embodiments, a method is provided for coordinating a change in status of a stored-value card for a customer. Transaction information is received at a host system from a point-of-sale terminal. The transaction information includes stored-value-card information identifying the stored-value card and payment-instrument information identifying a payment instrument to be used for financing the change in status of the stored-value card. The host system receives a payment authorization from a payment authority in response to a transmission of the payment-instrument information to the payment authority. The host system also receives a confirmation of the change in status of the stored-value card from a stored-value-card authority in response to a transmission of the stored-value-card information to the stored-value-card authority. The host system transmits an approval for effecting the change in status of the stored-value card to the point-of-sale terminal.

In some such embodiments, the change in status of the stored-value card may correspond to an activation of the stored-value card. In other such embodiments, the change in status of the stored-value card may correspond to an augmentation in value associated with the stored-value card. Transmission of the payment information to the payment authority and/or transmission of the stored-value-card information may be effected by the host system. In one embodiment, transmission of the stored-value-card information from the host system to the stored-value-card authority is performed after the payment authorization is received from the payment authority. The stored-value-card information may further identify an initial value associated with the card. Also the stored-value information may correspond to information read from a magnetic stripe comprised by the stored-value card. Similarly, the payment-instrument information may correspond to information read from a magnetic stripe comprised by the payment instrument. For example, the payment instrument may comprise a credit card or may comprise a debit card.

These methods may be embodied in a computer-readable storage medium having a computer-readable program embodied therein for directing operation of the host system. Such a host system may include a communications system and a processor. The computer-readable program includes instructions for operating the host system to coordinate a change in status of the stored-value card in accordance with the embodiments described above.

In another set of embodiments, a method is also provided for coordinating a change in status of a stored-value card for a customer. Transaction information is received with a point-of-sale terminal. The transaction information includes stored-value-card information identifying the stored-value card and payment-instrument information identifying a payment instrument to be used for financing the change in status of the stored-value card. The transaction information is transmitted with the point-of-sale terminal to a host system. An approval is received for effecting the change in status of the stored-value card from the host system with the point-of-sale terminal. The approval comprises a payment authorization for use of the payment instrument generated by a payment authority and a confirmation of the change in status of the stored-value card generated by a stored-value-card authority.

In some such embodiments, the change in status corresponds to an activation of the stored-value card, while in other embodiments, the change in status corresponds to an augmentation in value associated with the stored-value card. In some instances, the method may further comprise transmitting an instruction to print a receipt for the change in status of the stored-value card with the point-of-sale terminal. The transaction information may be received by reading a magnetic stripe comprised by the stored-value card and/or reading a magnetic stripe comprised by the payment instrument. For example, the payment instrument may comprise a credit card or may comprise a debit card.

These methods may be implemented by a point-of-sale device having an input device, a communications device, a processor in communication with the input device and the communications device, and a memory coupled with the processor. The memory comprises a computer-readable storage medium having a computer-readable program embodied therein for directing operation of the point-of-sale terminal to coordinate a change in status of the stored-value card in accordance with the embodiments described above.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

Figure 1:
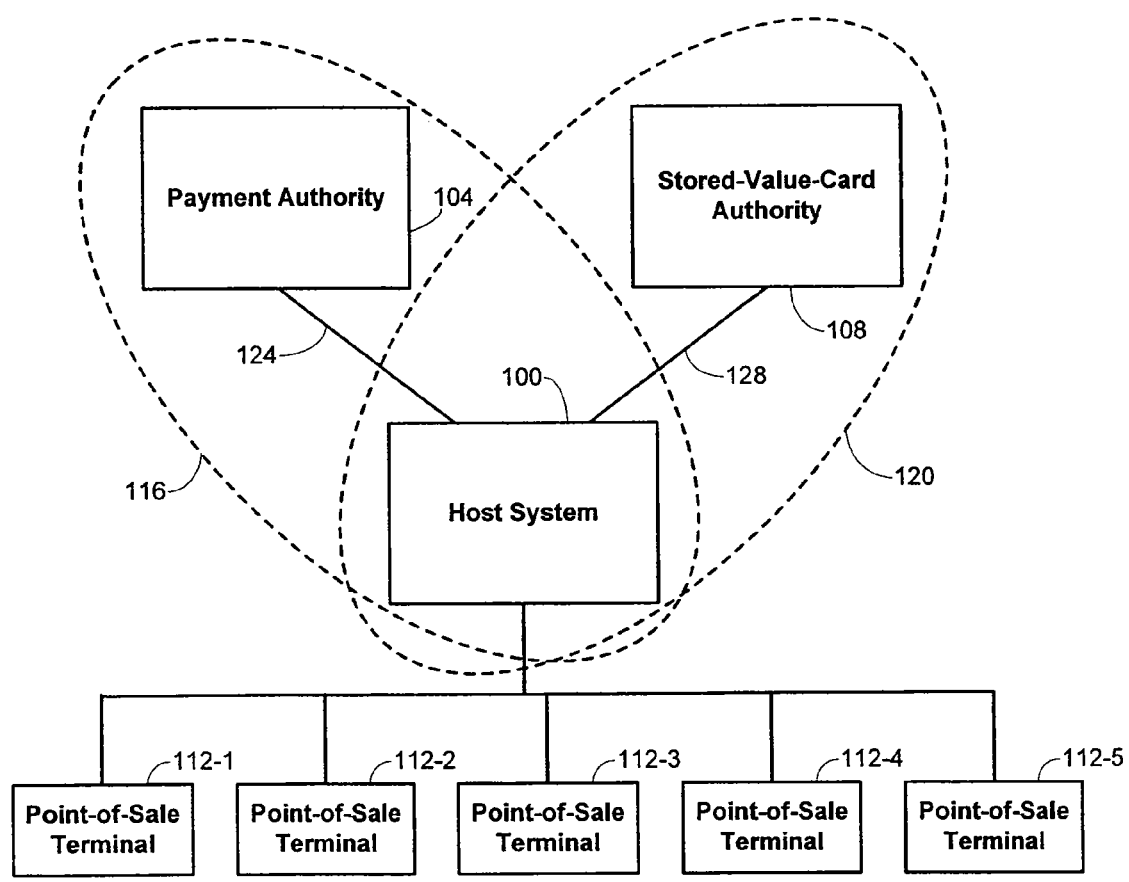
FIG. 1 is a block-diagram representation of an system arrangement used for implementing embodiments of the invention.

Embodiments of the invention provide methods and systems for activating stored-value cards for sale to customers and effecting other changes in their status. Some of these embodiments make use of a back-end infrastructure that permits point-of-sale terminals located at merchant outlets to provide all information needed to perform a transaction for the sale or reloading of a stored-value card. An overview of the infrastructure is illustrated schematically with the block-diagram arrangement shown in FIG. 1. Each of a plurality of point-of-sale terminals 112 is provided in communication with a host system 100. The point-of-sale terminals 112 may be located at merchant locations where stored-value cards may be purchased by customers. There is no limitation on the number of such point-of-sale terminals 112 that may be provided at each merchant location, some of which may have only a single point-of-sale terminal 112 and others of which may have multiple point-of-sale terminals 112. Thus, the schematic illustration of FIG. 1 is not intended to correspond to a physical distribution of point-of-sale terminals 112, but instead illustrates a logical arrangement in which the host system 100 is unconcerned with their physical distribution.

The host system 100 is provided in communication with each of a payment authority 104 and a stored-value-card authority 108. While for purposes of convenient illustration FIG. 1 shows the host system 100 in communication with only a single payment authority 104 and a single stored-value-card authority 108, more generally the host system 100 may be in communication with any number of such authorities. The payment authority 104 is controlled by an entity responsible for authorizing specific types of transactions. For example, the payment authority 104 may be controlled by or received cardholder data from a credit-card company, in which case it implements policies established by the credit-card company in authorizing transactions. Such policies typically require that the amount of a given transaction not result in a credit balance on a credit account that is greater than a predefined limit, that the credit account is not delinquent, that the card identifying the credit account has not been reported lost or stolen, and the like. In another example, the payment authority 104 may be controlled by a financial institution, such as a bank, that has issued debit cards to certain of its customers. The payment authority 104 then implements policies established by the financial institution in authorizing debit transactions. Such policies typically require that the amount of a given transaction be less than a current balance in the corresponding account, that the card identifying the account has not been reported lost or stolen, and the like. Still other payment authorities 104 may implement other policies, enabling transactions to be executed with checks, coupons, or other mechanisms, even including with stored-value cards.

The stored-value-card authority 108 is controlled by an entity responsible for managing the activation and/or use of stored-value cards. Such management functions include maintaining records of which stored-value cards have been activated and what the available level of funds is for each stored-value card, approving the use of activated stored-value cards for amounts no greater that the available funds level, and the like.

As explained in further detail below, embodiments of the invention make use of the host system 100 to coordinate communications with a point-of-sale terminal 112 where a change in status of a stored-value card is being performed, and with the corresponding payment authority 104 and stored-value-card authority 108 as needed. The change in status may be an activation or reloading of the card, or may be any other type of change in status. By having coordination of these communications handled by the host system 100, the complexity of the transaction from the perspective of the clerk and customer at the point-of-sale location is greatly simplified. In particular, the point-of-sale device 112 may be used to capture transaction-instrument information needed by the payment authority 104 and stored-value-card information needed by the stored-value-card authority 108. Communications between the point-of-sale device 112 and the host system 100 may be made using any of a wide variety of communications systems, such as by a telephone network, a wide-area network such as the Internet, a local-area network, a wireless network, or the like.

The dashed lines in FIG. 1 are used to illustrate that in some embodiments the host system 100 may be integrated with either the payment authority 104 or with the stored-value-card authority 108. For example, dashed line 116 illustrates an embodiment in which the host system 100 is integrated with the payment authority 104 so that their combined functionality may be implemented together. In such an instance, communication line 128 acts to effect communications between the combined (payment authority 104)/(host system 100) and the stored-value-card authority 108. Similarly, dashed line 120 illustrates an embodiment in which the host system 100 is integrated with the stored-value-card authority 108 so that their combined functionality may be implemented together. In this instance, communication line 124 acts to effect communications between the combined (stored-value-card authority 108)/(host system 100) and the payment authority 104.

In some instances, changing the status of the stored-value card may form only part of a transaction, in which case the point-of-sale device 112 may additionally be employed to capture information needed also to complete the remainder of the transaction. Accordingly, the point-of-sale device 112 may include or be in communication with associated equipment or devices used for capturing such information, such as bar-code information identifying an item that forms part of the full transaction. Furthermore, the point-of-sale device 112 may include other components that facilitate execution of a transaction, such as payment-information-entry components, signature-capture components, keypads, keyboards, display screens, biometric-data-capture components, speakers, printers, processors, software, memory, communication devices, and the like. Examples of suitable point-of-sale devices that include multiple capabilities are provided in the following commonly assigned applications, the entire disclosures of which are incorporated herein by reference for all purposes: U.S. Prov. Pat. Appl. No. 60/147,889, entitled "INTEGRATED POINT OF SALE DEVICE," filed Aug. 9, 1999 by Randy J. Templeton et al.; U.S. patent application Ser. No. 09/634,901, entitled "POINT OF SALE PAYMENT SYSTEM," filed Aug. 9, 2000 by Randy J. Templeton et al.; U.S. patent application Ser. No. 10/116,689, entitled "SYSTEMS AND METHODS FOR PERFORMING TRANSACTIONS AT A POINT-OF-SALE," filed Apr. 3, 2002 by Earney Stoutenburg et al.; U.S. patent application Ser. No. 10/116,733, entitled "SYSTEMS AND METHODS FOR DEPLOYING A POINT-OF-SALE SYSTEM," filed Apr. 3, 2002 by Earney Stoutenburg et al.; U.S. patent application Ser. No. 10/116,686, entitled "SYSTEMS AND METHODS FOR UTILIZING A POINT-OF-SALE SYSTEM," filed Apr. 3, 2002 by Earney Stoutenburg et al.; and U.S. patent application Ser. No. 10/116,735, entitled "SYSTEMS AND METHODS FOR CONFIGURING A POINT-OF-SALE SYSTEM," filed Apr. 3, 2002 by Earney Stoutenburg.

Figure 2:
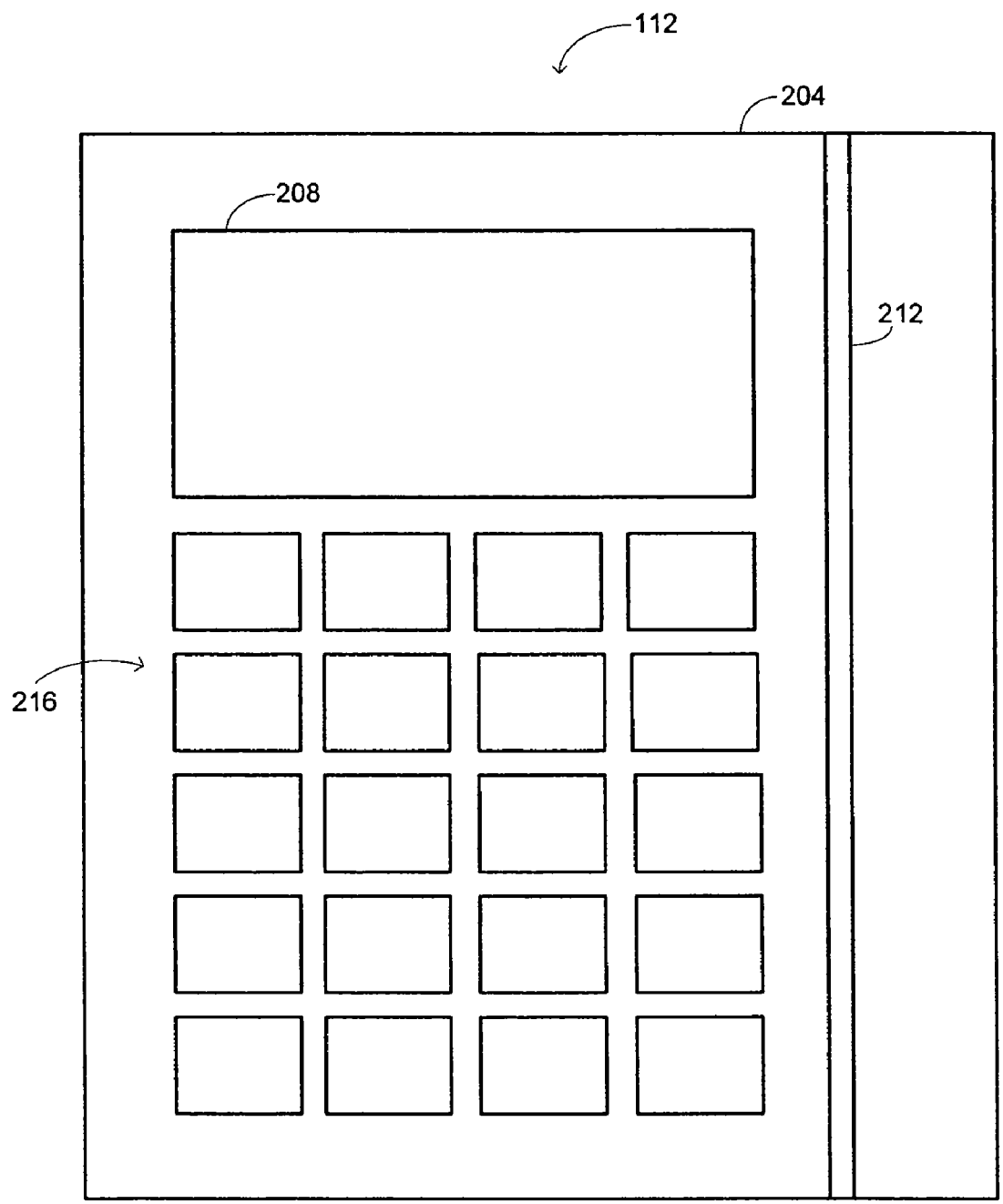
FIG. 2 is a schematic diagram of a point-of-sale terminal that may be used with the system of FIG. 1.

One specific example of how a point-of-sale device 112 may be constructed is illustrated in FIG. 2. In this embodiment, the point-of-sale device 112 comprises a housing 204 having a keypad 216 for entering various types of information. The keys of the keypad 216 may permit the entry of numbers or letters, or may be function keys for performing various predefined functions. The device 112 further includes a display screen 208 for displaying information relating to a transaction. A card reader 212 is also provided for reading information from cards, such as from a magnetic stripe included on the cards. The card reader 212 may thus read payment information, identification information, and the like from encoding on the cards. In some instances, the point-of-sale device 112 may be connected to an attached printer, such as an FDX-400 printer available from AXIOHM.

Figure 3:
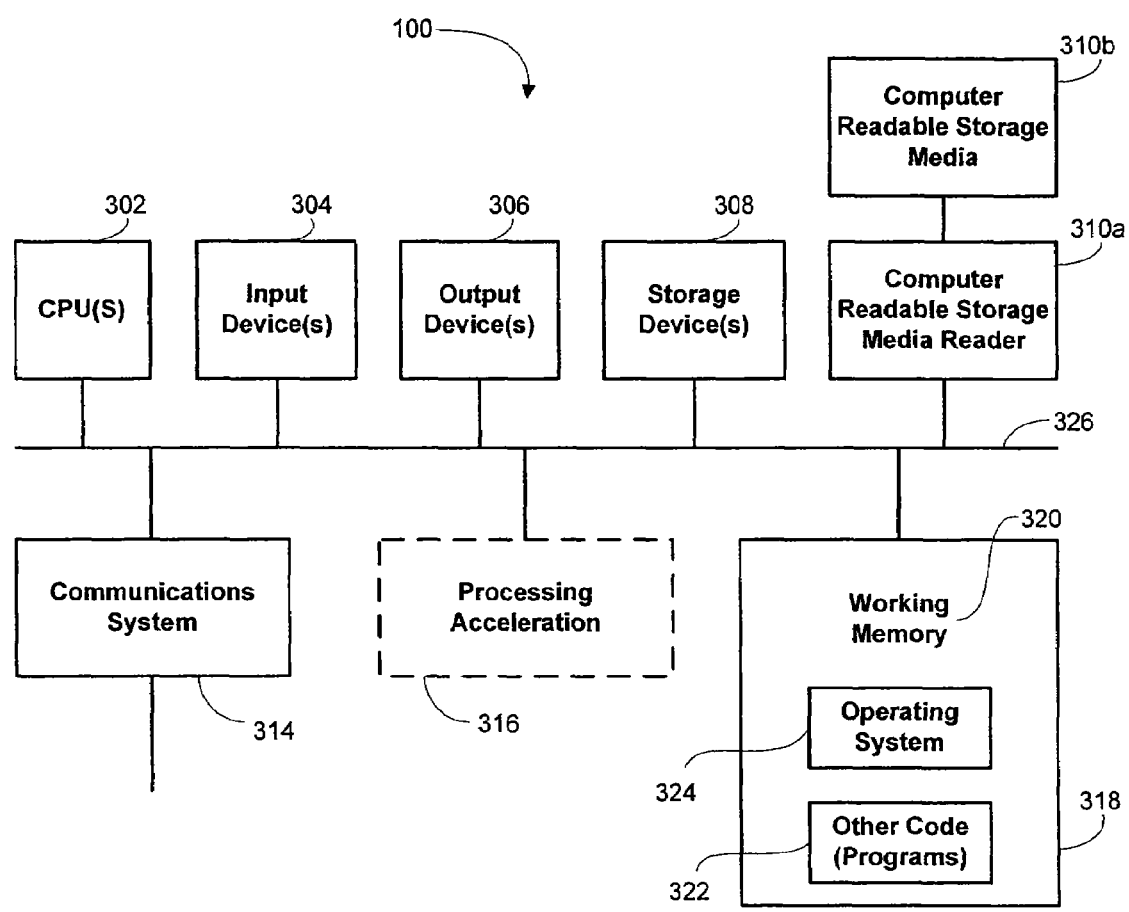
FIG. 3 is schematic illustration of a computer system on which methods of the invention may be embodied.

FIG. 3 provides a schematic illustration of a structure that may be used to implement the host system 100. FIG. 3 broadly illustrates how individual system elements may be implemented in a separated or more integrated manner. The host system 100 is shown comprised of hardware elements that are electrically coupled via bus 326, including a processor 302, an input device 304, an output device 306, a storage device 308, a computer-readable storage media reader 310a, a communications system 314, a processing acceleration unit 316 such as a DSP or special-purpose processor, and a memory 318. The computer-readable storage media reader 310a is further connected to a computer-readable storage medium 310b, the combination comprehensively representing remote, local, fixed, and/or removable storage devices plus storage media for temporarily and/or more permanently containing computer-readable information. The communications system 314 may comprise a wired, wireless, modem, and/or other type of interfacing connection and permits data to be exchanged with the point-of-sale devices 112, payment authority 104, and/or stored-value-card authority 108, as described in connection with FIGS. 1-2.

The host system 100 also comprises software elements, shown as being currently located within working memory 320, including an operating system 324 and other code 322, such as a program designed to implement methods of the invention. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

Figure 4:
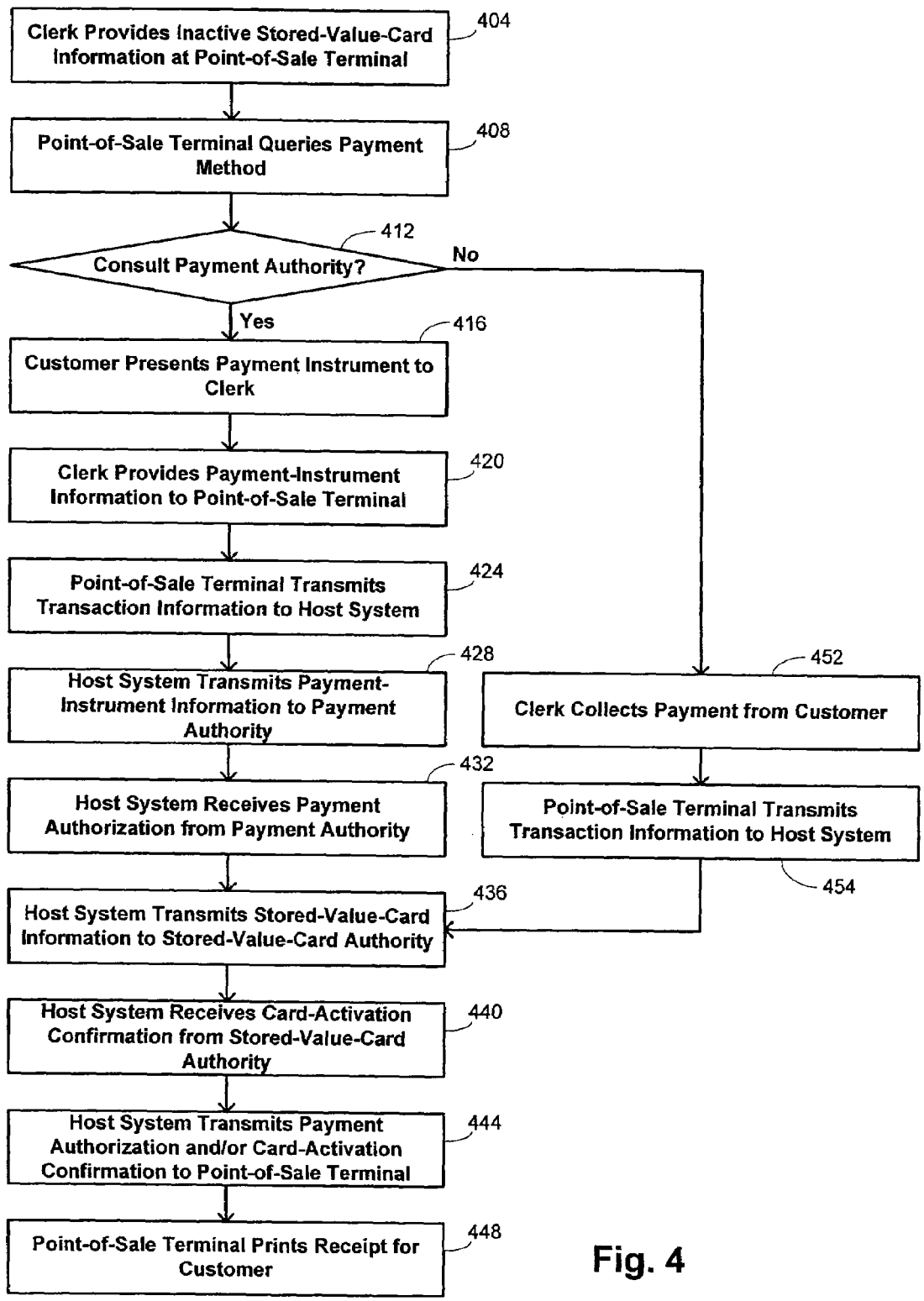
FIG. 4 is a flow diagram illustrating methods of the invention in certain embodiments.

An overview of how the system described above may be used in some embodiments to coordinate a change in status of stored-value cards is provided with the flow diagram of FIG. 4. This overview uses the specific example of a change in status that results in activation of the stored-value card, although it will be apparent that other changes in status may be coordinated similarly. In the following discussion of FIG. 4, reference is also sometimes made to FIGS. 5A-5C, which provide examples of displays that may be provided on the display screen 208 of the point-of-sale device 112 as a transaction involving the sale of a stored-value card is made. While blocks are presented in a particular order in FIG. 4, such an order is not required and the corresponding operations may be performed in alternative orders without exceeding the intended scope of the invention.

Figure 5A:
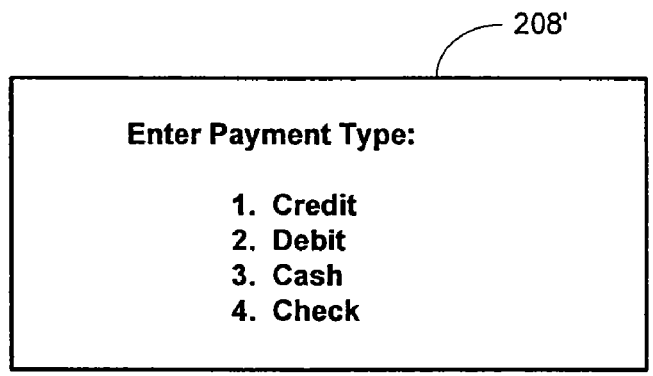
FIGS. 5A-5C are illustrative display screens of the point-of-sale terminal of FIG. 2 that may be shown during the methods illustrated with FIG. 4.
Figure 5B:
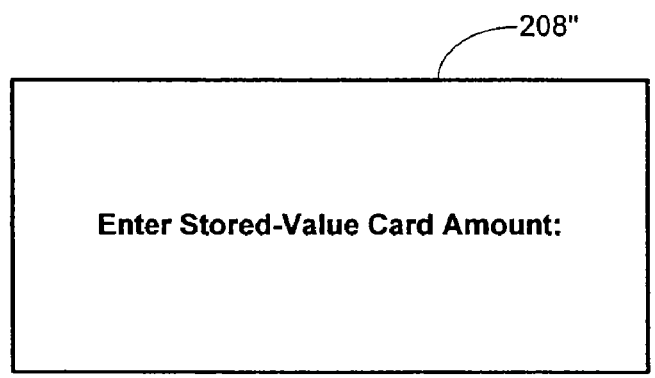
Figure 5C:
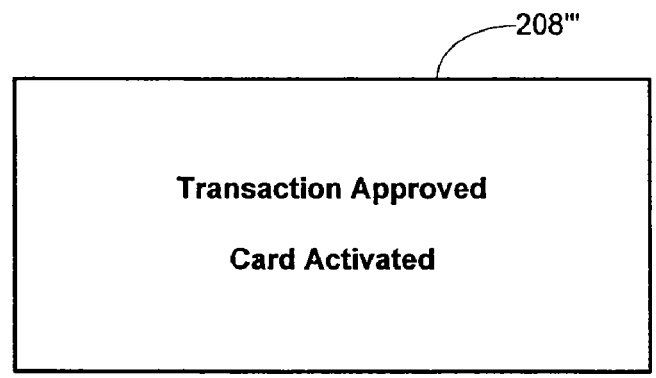

When a customer decides to purchase a stored-value card at a merchant location, the selected card is generally inactive, meaning that it has not been activated for purchases by the stored-value-card authority 108. Providing cards in an inactive form aids in fraud prevention since any attempt to use the card without having first undergone a valid activation procedure will be denied. Part of the method illustrated with FIG. 4 results in activation of the card purchased by the customer. Thus, at block 404, a clerk at the merchant location provides information identifying the as-yet inactive stored-value card to be purchased by the customer to a point-of-sale terminal 112 at the merchant location. This may be done, for example, by swiping the card through a magnetic-stripe reader comprised by the point-of-sale terminal 112. The identifying information for the card is then read from the magnetic stripe on the card. In other embodiments, other techniques may be used to obtain the identification information, such as by reading a bar code on the card, having the clerk key in a number printed or embossed on the card, and the like. In some instances, the information read from the card by the point-of-sale terminal 112 may identify the initial value that is to be applied to the card. In other embodiments, this information may be solicited from the clerk, such as by presenting a query 208' as shown in FIG. 5A and requesting that the clerk key the initial value into the point-of-sale terminal 112.

The manner in which the transaction is completed may depend on the payment method used by the customer. This may depend not only on whether the selected payment method requires authorization by a payment authority 104, but may also depend on which payment authority 104 is needed to provided the authorization. Thus, at block 408, the point-of-sale terminal 112 may display a query to the clerk requesting identification of the payment method. An example of a typical display 208" is shown in FIG. 5A. In this example, the query prompts the clerk to select one of a plurality of different payment types, including credit-, debit-, cash-, and check-based payments, only some of which require authentication by a payment authority.

A determination is made whether the transaction is of a type where a payment authority 104 is to be consulted. If so, the customer presents a payment instrument to the clerk at block 416. The payment instrument may, for example, take the form of a credit card, debit card, cash, or check. These examples correspond to the types of payment provided by the prompt in FIG. 5A, but other types of payment may alternatively be used in embodiments where the point-of-sale terminal 112 is equipped to accept such alternative payment types. The clerk provides information regarding a payment instrument presented by the customer for payment to the point-of-sale terminal 112 at block 420. In cases where the payment instrument is a credit or debit card, this information may be provided by swiping the credit or debit card through a magnetic-stripe reader comprised by the point-of-sale terminal 112. The payment-instrument information is then read directly from the magnetic stripe on the card. In cases where the payment instrument comprises a check, a magnetic-ink character-recognition ("MICR") reader may be used by the point-of-sale device to read information from the MICR line of the check. Still other forms of payment-instrument information may be provided to a suitably equipped point-of-sale terminal 112 using other types of devices, such as bar-code readers, optical scanners, and the like. In some instances, merchants may also to choose to accept certain payment instruments even if their point-of-sale terminal 112 is not specifically equipped with a particular type of input device by allowing the clerk to key in information that the clerk reads from the instrument.

After block 420, the point-of-sale terminal 112 thus has complete information regarding the transaction, including both the stored-value-card information and the payment-instrument information. In particular, there is no need for the clerk to enter the amount to be charged to the customer for activation of an initial value on the stored-value card since that amount was previously collected at block 404. This reduces both the likelihood of an error by the clerk and the possibility of fraud associated with the transaction. The point-of-sale terminal 112 thus transmits an electronic packet to the host system 100 that defines the transaction information at block 424, including the collected stored-value-card information and payment-instrument information.

Upon receipt of this information, the host system 100 acts to parse the electronic packet so that respective portions of the information that it receives may be transmitted to the payment authority 104 and to the stored-value-card authority 108. At block 428, the payment-instrument information is transmitted by the host system 100 to the payment authority 104. This may be accompanied with sufficient information regarding the transaction for the payment authority 104 to determine whether the transaction comports with policies established for authorizing transactions for the identified payment instrument. Such an analysis may include, for example, verifying that a corresponding credit account is not delinquent, that the payment instrument has not been reported lost or stolen, that application of the transaction amount would not result in a credit balance exceeding a predefined limit, and the like. If the transaction is consistent with such established policies, the payment authority 104 transmits an authorization code, which may be received by the host system 100 at block 432. In the event that the payment authority 104 fails to transmit an authorization code, or specifically transmits a nonauthorization code, the host system 100 may instruct the point-of-sale terminal 112 to decline the transaction.

At block 436, the host system 100 transmits the stored-value-card information to the stored-value-card authority 108. The stored-value-card authority 108 identifies this information as a request for activation of the card, which is performed by updating records stored by the stored-value-card authority 108 to identify the card as active and establish an initial value balance for the card. Subsequently, when the stored-value-card is used by the customer, the stored-value-card authority 108 will acknowledge the activation of the card and update the card's balance as appropriate to reflect use of the card for purchases or reloading of the card with additional value. The activation of the card is confirmed by the stored-value-card authority by transmitting a card-activation confirmation, which is received by the host system 100 at block 440.

In some embodiments, the operation of block 436 may be performed after the host system 100 has received the payment authorization at block 432. This specific order of operations has the advantage that the host system 100 already knows that payment has been authorized before it seeks activation of the card by the stored-value-card authority 108. In other embodiments, transmission of the stored-value-card information at block 436 may be performed before receipt of the payment authorization at block 432; in one embodiment, the transmissions at block 428 and 436 are performed substantially contemporaneously. These embodiments have the advantage of reducing the overall time for the host system 100 to receive both the payment authorization at block 432 and the card-activation confirmation at block 440, reflecting the fact that the large majority of transactions are expected to be approved. In the event that a particular transaction is not approved in such cases, the host system 100 may be configured to transmit a deactivation request for the stored-value card back to the stored-value-card authority 108.

At block 444, the host system transmits the payment authorization and card-activation confirmation to the point-of-sale terminal 112. In one embodiment, the payment authorization and card-activation confirmation are provided in a common approval message. The point-of-sale terminal 112 may then acknowledge the receipt of such an approval message to the clerk by providing a notice on a display screen of the point-of-sale terminal 112, such as illustrated with display screen 208''' in FIG. 5C. With these responses, the point-of-sale terminal 112 causes a receipt to be printed for the customer's signature to complete the transaction at block 448.

FIG. 4 also illustrates that the architecture described in connection with FIG. 1 may still be used to activate stored-value cards even when the transaction need not involve a payment authority, such as when the purchase is made in cash. This is reflected by the lack of a need to consult the payment authority at block 412, in which case the clerk collects payment directly from the customer at block 452. Upon identification by the clerk that the transaction does not involve a payment authority, such as by selecting the "Cash" option in FIG. 5A at block 408, the point-of-sale terminal 112 automatically transmits the transaction information to the host system 100 at block 454 without any request for payment-instrument information. Receipt of such information causes the host system 100 to transmit the stored-value-card information to the stored-value-card authority 108 at block 440 without transmitting any information to the payment authority 104. Accordingly, when the host system 100 receives a card-activation confirmation at block 440, the confirmation is transmitted to the point-of-sale terminal 112 at block 444 and a receipt printed for the customer at block 448.

Thus, embodiments of the invention permit coordination of transactions involving stored-value cards to be performed for customers in a variety of convenient ways. While the description in connection with FIG. 4 focuses on activation of stored-value cards, it is evident that the same method may be used to effect any change in status of a stored-value card. For example, if a customer is already in possession of a stored-value card and wishes to augment the value associated with the card, the same method may be followed, with the stored-value-card information comprising a request for a value augmentation. In this instance, the transaction supported by the payment instrument is used for the value augmentation instead of being used for card activation. Accordingly, the confirmation received by the host at block 440 and transmitted to the point-of-sale terminal 112 at block 444 may be a confirmation that the augmentation request has been implemented. Still other changes in status of the stored-value card may be implemented using the methods described herein.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

The invention claimed is:

1. A system for coordinating a change in status of a stored-value card for a customer, the system comprising:
    a point-of-sale terminal configured to:
        transmit transaction information including identifier information read from and identifying the stored-value card and payment-instrument information identifying a payment instrument to be used for financing the change in status of the stored-value card; and
        receive approval for effecting the change in status of the stored-value card; and
    a host system, in communication with the point-of-sale terminal, and configured to:
        receive the transaction information;
        parse the identifier information and the payment-instrument information from the received transaction information;
        transmit the parsed payment-instrument information to a payment authority;
        receive a payment authorization in response to the transmission of the payment-instrument information;
        transmit the parsed identifier information to a stored-value-card authority;
        receive a confirmation of the change in status of the stored-value card in response to the transmission of the identifier information; and
        transmit the approval for effecting the change in status of the stored-value card.

2. The system of claim 1, wherein the change in status of the stored-value card corresponds to an activation of the stored-value card or an augmentation in value associated with the stored-value card.

3. The system of claim 1, wherein the transmission of the identifier information to the stored-value-card authority is performed after receiving the payment authorization from the payment authority.

4. The system of claim 1, wherein the identifier information further identifies an initial value associated with the stored-value card and corresponds to information read from a magnetic stripe comprised by the stored-value card.

5. The system of claim 1, wherein,
    the payment-instrument information corresponds to information read from a magnetic stripe comprised by the payment instrument; and
    the payment instrument comprises a credit card or a debit card.

6. The system of claim 1, further comprising:
    the payment authority, in communication with the host system, and configured to:
        receive the parsed payment-instrument information; and
        transmit the payment authorization; and
    the stored-value-card authority, in communication with the host system, and configured to:
        receive the parsed identifier information transmitted from the host system; and
        transmit the confirmation of the change in status of the stored-value card in records of the stored-value-card authority to the host system.

7. The system of claim 6, wherein the payment authority is controlled by an entity different from the host system.

8. The system of claim 6, wherein the stored-value-card authority is controlled by a different entity from the host system.

9. A system for coordinating a change in status of a stored-value card for a customer, the system comprising:
    a host system configured to:
        receive transaction information from a point-of-sale terminal, the transaction information including identifier information identifying the stored-value card and payment-instrument information identifying a payment instrument to be used for financing the change in status of the stored-value card;
        parse the identifier information and the payment-instrument information from the received transaction information;
        transmit the parsed payment-instrument information to a payment authority;
        receive a payment authorization from the payment authority;
        transmit the parsed identifier information to a stored-value-card authority;
        receive from the stored-value-card authority a confirmation of the change in status of the stored-value card; and
        transmit an approval for effecting the change in status of the stored-value card;
    the payment authority, in communication with the host system, and configured to:
        receive the parsed payment-instrument information; and
        transmit the payment authorization; and
    the stored-value-card authority, in communication with the host system, and configured to:
        receive the parsed identifier information transmitted from the host system; and
        transmit the confirmation of the change in status of the stored-value card.

10. The system of claim 9, wherein the change in status of the stored-value card corresponds to an activation of the stored-value card and an augmentation in value associated with the stored-value card.

11. The system of claim 9, wherein the transmission of the identifier information to the stored-value-card authority is performed before receiving the payment authorization from the payment authority.

12. The system of claim 9, wherein,
the identifier information further identifies an initial value associated with the stored-value card; and
the payment-instrument information corresponds to information read by the point-of-sale device from the payment instrument.

13. The system of claim 9, wherein,
the payment authority is further configured to verify whether an amount of the transaction is less than or equal to a current balance in a corresponding account for the payment instrument; and
the stored-value-card authority is further configured to effect a change in status in records associated with the identifier information.

14. A host system for coordinating a change in status of a stored-value card for a customer, the host system configured to:
receive transaction information from a point-of-sale terminal, the transaction information including identifier information read from and identifying the stored-value card and payment-instrument information identifying a payment instrument to be used for financing the change in status of the stored-value card;
parse the identifier information and the payment-instrument information from the received transaction information;
transmit the parsed payment-instrument information to a payment authority;
receive a payment authorization from the payment authority in response to the transmission of the payment-instrument information to the payment authority;
transmit the parsed identifier information to a stored-value-card authority;
receive from the stored-value-card authority a confirmation of the change in status of the stored-value card, the confirmation received in response to the transmission of the identifier information to the stored-value-card authority; and
transmit to the point-of-sale terminal an approval for effecting the change in status of the stored-value card.

15. The host system of claim 14, wherein,
the change in status of the stored-value card corresponds to an activation of the stored-value card or an augmentation in value associated with the stored-value card; and
the identifier information further identifies an initial value associated with the stored-value card and corresponds to information read from the stored-value card.

16. The host system of claim 14, wherein,
the payment-instrument information corresponds to information read from the payment instrument.

17. The host system of claim 14, further comprising:
the payment authority, in communication with the host system, and configured to:
receive the parsed payment-instrument information; and
transmit the payment authorization; and
the stored-value-card authority, in communication with the host system, and configured to:
receive the parsed identifier information transmitted from the host system; and
transmit the confirmation of the change in status of the stored-value card in records of the stored-value-card authority to the host system.

18. The host system of claim 14, wherein,
the payment authority is controlled by a different entity from the host system; and
the stored-value-card authority is controlled by an entity different from the host system.

19. The host system of claim 14, wherein the host system comprises a plurality of devices.

20. The host system of claim 19, wherein;
a first subset of the plurality of devices is remote from a second subset of the plurality of devices; and
the host system comprises the payment authority and the stored-value-card authority.

21. The host system of claim 19, wherein the plurality of devices are local to one another.

22. A method for coordinating a change in status of a stored-value card for a customer, the method comprising:
receiving transaction information from a point-of-sale terminal, the transaction information including identifier information read from and identifying the stored-value card and payment-instrument information identifying a payment instrument to be used for financing the change in status of the stored-value card;
parsing the identifier information and the payment-instrument information from the received transaction information;
transmitting the parsed identifier to a stored-value-card authority;
transmitting the parsed payment-instrument information to a payment authority;
receiving a payment authorization from the payment authority in response to the transmission of the payment-instrument information to the payment authority;
receiving from the stored-value-card authority a confirmation of the change in status of the stored-value card in records of the stored-value-card authority, the confirmation received in response to the transmission of the identifier information to the stored-value-card authority; and
transmitting an approval for effecting the change in status of the stored-value card to the point-of-sale terminal.

23. The method of claim 22, wherein,
the change in status of the stored-value card corresponds to an activation of the stored-value card or an augmentation in value associated with the stored-value card;
the transmission of the identifier information to the stored-value-card authority is performed after receiving the payment authorization from the payment authority;
the identifier information is read from the stored-value card and further identifies an initial value associated with the stored-value card; and
the payment-instrument information corresponds to information read from a magnetic stripe comprised by the payment instrument.

24. The method of claim 22, wherein,
the payment authority comprises a financial institution controlled by a first entity, different from the host system;
the stored-value-card authority comprises an entity managing activation and use of stored-value cards, the stored-value-card authority controlled by a second entity, different from the host system; and
the first entity and the second entity comprise different entities.

* * * * *

UNITED STATES PATENT AND TRADEMARK OFFICE
CERTIFICATE OF CORRECTION

PATENT NO.       : 7,668,751 B2                                                             Page 1 of 1
APPLICATION NO. : 12/147944
DATED            : February 23, 2010
INVENTOR(S)      : Baumgartner et al.

It is certified that error appears in the above-identified patent and that said Letters Patent is hereby corrected as shown below:

Column 1, at approximately line 4, after the title and before the heading entitled BACKGROUND OF THE INVENTION, insert --This application is a continuation of U.S. Patent Application No. 10/371,167, filed February 21, 2003, entitled "METHODS AND SYSTEMS FOR COORDINATING A CHANGE IN STATUS OF STORED-VALUE CARDS", which is hereby incorporated by reference in its entirety for all purposes.--

Signed and Sealed this

Twenty-seventh Day of April, 2010

David J. Kappos
*Director of the United States Patent and Trademark Office*